US012732962B2

(12) United States Patent
Ye et al.

(10) Patent No.: US 12,732,962 B2
(45) Date of Patent: Sep. 8, 2026

(54) TECHNOLOGIES FOR PERIODIC RESOURCE RESERVATION IN PREEMPTION

(71) Applicant: Apple Inc., Cupertino, CA (US)

(72) Inventors: Chunxuan Ye, Cupertino, CA (US); Chunhai Yao, Cupertino, CA (US); Dawei Zhang, Cupertino, CA (US); Haitong Sun, Cupertino, CA (US); Hong He, Cupertino, CA (US); Jia Tang, Cupertino, CA (US); Oghenekome Oteri, Cupertino, CA (US); Sigen Ye, Cupertino, CA (US); Wei Zeng, Cupertino, CA (US); Weidong Yang, Cupertino, CA (US); Yushu Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,220

(22) PCT Filed: May 14, 2020

(86) PCT No.: PCT/CN2020/090207
§ 371 (c)(1),
(2) Date: Sep. 24, 2021

(87) PCT Pub. No.: WO2021/226924
PCT Pub. Date: Nov. 18, 2021

(65) Prior Publication Data

US 2023/0057486 A1 Feb. 23, 2023

(51) Int. Cl.
*H04L 43/0823* (2022.01)
*H04B 7/06* (2006.01)
(Continued)

(52) U.S. Cl.
CPC ........... *H04W 72/02* (2013.01); *H04W 72/20* (2023.01); *H04W 72/543* (2023.01); *H04W 72/563* (2023.01)

(58) Field of Classification Search
CPC ..... H04W 28/26; H04W 72/04; H04W 72/02; H04W 72/25; H04W 72/0446;
(Continued)

(56) References Cited

U.S. PATENT DOCUMENTS

2009/0262699 A1* 10/2009 Wengerter ............ H04L 1/1812 370/330
2011/0256870 A1* 10/2011 Park ................. H04W 36/0085 455/436
(Continued)

FOREIGN PATENT DOCUMENTS

CN 110402591 A 11/2019
CN 110710300 A 1/2020
(Continued)

OTHER PUBLICATIONS

European Search Report and Search Opinion received for European Application No. 20935005.7, mailed on Dec. 4, 2023, 9 pages.
(Continued)

*Primary Examiner* — Marcus Smith
*Assistant Examiner* — Jason A Harley
(74) *Attorney, Agent, or Firm* — Flare IP PLLC

(57) ABSTRACT

A method and apparatus of a device that selects a periodic resource associated with a pre-empted resource on a wireless link between a first user equipment and one or more second user equipment is described. In exemplary embodiments, the device detects a pre-empted resource that is one of a plurality of resources reserved for a first UE on a wireless link between the first UE and a second UE. In addition, the device may determine a new resource for the pre-empted
(Continued)

resource. The device may further determine a periodic resource for the plurality of reserved resources.

15 Claims, 13 Drawing Sheets

(51) Int. Cl.

| | |
|---|---|
| ***H04W 48/12*** | (2009.01) |
| ***H04W 72/02*** | (2009.01) |
| ***H04W 72/04*** | (2023.01) |
| ***H04W 72/0446*** | (2023.01) |
| ***H04W 72/20*** | (2023.01) |
| ***H04W 72/23*** | (2023.01) |
| ***H04W 72/543*** | (2023.01) |
| ***H04W 72/563*** | (2023.01) |
| ***H04W 74/00*** | (2009.01) |
| ***H04W 88/02*** | (2009.01) |

(58) Field of Classification Search

CPC ............. H04W 52/0216; H04L 1/1812; H04L 1/1887; H04L 5/0082; H04L 1/1854; H04L 47/245

USPC .................................................. 370/336, 330

See application file for complete search history.

(56) References Cited

U.S. PATENT DOCUMENTS

2016/0007322 A1* 1/2016 Agardh ................. H04W 72/23 370/329
2017/0034799 A1* 2/2017 Kim .................... H04W 56/003
2017/0280472 A1* 9/2017 Gupta ................... H04W 72/51
2018/0278368 A1 9/2018 Kim et al.
2019/0254045 A1* 8/2019 Sadiq .................... H04W 72/12
2019/0327757 A1* 10/2019 Oteri ..................... H04L 5/0053
2020/0008216 A1 1/2020 Iyer et al.
2020/0068531 A1* 2/2020 Sundberg .......... H04W 52/0216
2020/0146044 A1* 5/2020 Maaref ................. H04W 72/02
2020/0213975 A1 7/2020 Chae et al.
2020/0229194 A1* 7/2020 Belleschi .............. H04L 5/0064
2021/0051654 A1* 2/2021 Wang .................... H04L 1/1887
2021/0127407 A1 4/2021 Shapin et al.
2021/0266951 A1* 8/2021 Gulati .................. H04B 17/318
2021/0289473 A1* 9/2021 Chae ..................... H04L 1/1819
2021/0321396 A1* 10/2021 Li ......................... H04W 72/23
2021/0360481 A1* 11/2021 Nguyen ................ H04W 28/26
2021/0385822 A1* 12/2021 Chae ................. H04W 72/0453
2022/0256553 A1* 8/2022 Lin ..................... H04W 72/566
2022/0312438 A1* 9/2022 Yi ..................... H04W 72/1263
2022/0361196 A1* 11/2022 Sarkis ................. H04W 72/569
2023/0020105 A1* 1/2023 Shin .................... H04W 72/542
2023/0028098 A1* 1/2023 Lin .................. H04W 72/0446
2023/0180264 A1* 6/2023 Kim .................... H04B 7/0695 455/414.1

FOREIGN PATENT DOCUMENTS

CN 111093287 A 5/2020
CN 111108788 A 5/2020
CN 111132310 A 5/2020
WO 2019028276 A1 2/2019
WO 2020/017939 A1 1/2020
WO 2020/033088 A1 2/2020
WO 2020073283 A1 4/2020
WO 2020/091348 A1 5/2020

OTHER PUBLICATIONS

International Preliminary Report on Patentability received for PCT Patent Application No. PCT/CN2020/090207, mailed on Nov. 24, 2022, 7 pages.
International Search Report and Written Opinion received for PCT Patent Application No. PCT/CN2020/090207, mailed on Feb. 18, 2021, 8 pages.
Office Action received for Chinese Patent Application No. 202080100822.0, mailed on Jul. 22, 2024, 21 pages (13 pages of English Translation and 08 pages of Original Document).
Search Report received for Chinese Patent Application No. 202080100822.0, mailed on Jul. 22, 2024, 5 pages (2 pages of English Translation and 3 pages of Official Copy).
Search Report received for Chinese Patent Application No. 202080100822.0, mailed on Feb. 19, 2025, 3 pages (1 pages of English Translation and 2 Pages of Official Copy).

* cited by examiner

TECHNOLOGIES FOR PERIODIC RESOURCE RESERVATION IN PREEMPTION

RELATED APPLICATIONS

The present application is the national phase of International Application No. PCT/CN2020/090207, filed on May 14, 2020 and the disclosure of which is hereby incorporated herein by reference in its entirety.

FIELD OF INVENTION

This invention relates generally to wireless technology and more particularly to rescheduling pre-empted periodic resources of a wireless link.

BACKGROUND OF THE INVENTION

In a wireless communications network, a user equipment (UE) determines a number of available resources to communicate data and selects a subset of these resources for use in communicating the data. In addition, the UE can reserve resources over different periods for periodic data communication. A problem can occur because another UE with higher priority can preempt the resource selected by the original UE.

SUMMARY OF THE DESCRIPTION

A method and apparatus of a device that selects a periodic resource associated with a pre-empted resource on a wireless link between a first user equipment and one or more second user equipment is described. In exemplary embodiments, the device detects a pre-empted resource that is one of a plurality of resources reserved for a first UE on a wireless link between the device and another user equipment. In addition, the device may determine a new resource for the pre-empted resource. The device may further determine a periodic resource for the plurality of reserved resources.

In further embodiments, a non-transitory machine-readable medium having executable instructions that is executed by one or more processing units of a first user equipment (UE) is described. In exemplary embodiments, the UE detects a pre-empted resource that is one of a plurality of resources reserved for a first UE on a wireless link between the first UE and a second UE. In addition, the UE determines a new resource for the pre-empted resource. The UE further determines the periodic resource for the plurality of reserved resources.

In some embodiments, the pre-empted resource is a resource that is one of the plurality of resources and is replaced by higher priority data transmission from a third UE. In addition, the UE may determine the periodic resource by determining a time gap between the new resource and a resource that precedes or follows the new resource. If the time gap is greater than a threshold, the UE may assign the periodic resource based on at least the pre-empted resource or, if the time gap is less than or equal than threshold, the UE may assign the periodic resource based on at least the preceding or following resource.

In alternate embodiments, the periodic resource is a resource that is one of a plurality resources scheduled over a plurality of periods in regular intervals and the time gap is 32 slots or some other numbers of slots. The UE may determine the periodic resource by determining the periodic resource based on a configuration. In addition, the UE may decrement a counter when the new resource is selected after the pre-empted resource is pre-empted.

In other embodiments, a non-transitory machine-readable medium having executable instructions that is executed by one or more processing units of a first user equipment (UE) is described. In exemplary embodiments, the UE may determine a plurality of resources for the wireless link. In addition, the UE may rank the plurality of resources based on at least a priority associated with each of the plurality of resources. The UE may further select a subset of the plurality of resources. In addition, the selecting may be based on a percentage and the percentage is based on a type of wireless link and the priority may be based on at least an sidelink control information data priority for each of the plurality of resources.

In some embodiments, a non-transitory machine-readable medium having executable instructions that is executed by one or more processing units of a first user equipment (UE) is described. In these embodiments, the UE may receive a resource pool configuration that is used to configure one or more resources for sidelink transmission. If the resource pool configuration has physical sidelink feedback channel resources, the UE may set a physical uplink control channel field to nonzero bits. Alternatively, if the resource pool configuration does not have physical sidelink feedback channel resources, the UE may set a physical uplink control channel field to zero bits. In addition, if the resource pool configuration has physical sidelink feedback channel resources, the UE may set a physical sidelink feedback channel resources to hybrid automatic repeat request to nonzero bits. In addition, if the resource pool configuration does not have physical sidelink feedback channel resources, the UE may a physical sidelink feedback channel resources to hybrid automatic repeat request field to zero bits.

In further embodiments, a method detects a pre-empted resource that is one of a plurality of resources reserved for a first UE on a wireless link between the first UE and a second UE. In addition, the method determines a new resource for the pre-empted resource. The method further determines the periodic resource for the plurality of reserved resources.

In further embodiments, the pre-empted resource is a resource that is one of the plurality of resources and is replaced by higher priority data transmission from a third UE. In addition, the method may determine the periodic resource by determining a time gap between the new resource and a resource that precedes or follows the new resource. If the time gap is greater than a threshold, the UE may assign the periodic resource based on at least the pre-empted resource or, if the time gap is less than or equal than threshold, the UE may assign the periodic resource based on at least the preceding or following resource.

In alternate embodiments, the periodic resource is a resource that is one of a plurality resources scheduled over a plurality of periods in regular intervals and the time gap is 32 slots or some other number of slots. The method may determine the periodic resource by determining the periodic resource based on a configuration. In addition, the method may decrement a counter when the new resource is selected after the pre-empted resource is pre-empted.

In other embodiments, a method may determine a plurality of resources for the wireless link. In addition, the method ranks the plurality of resources based on at least a priority associated with each of the plurality of resources. The method may further select a subset of the plurality of resources. In addition, the selecting may be based on a percentage and the percentage is based on a type of wireless link and the priority may be based on at least an sidelink control information data priority for each of the plurality of resources.

In some embodiments, a method may receive a resource pool configuration that is used to configure one or more resources for sidelink transmission. If the resource pool configuration has physical sidelink feedback channel resources, the method may set a physical uplink control channel field to nonzero bits. Alternatively, if the resource pool configuration does not have physical sidelink feedback channel resources, the method may set a physical uplink control channel field to zero bits. In addition, if the resource pool configuration has physical sidelink feedback channel resources, the method may set a physical sidelink feedback channel resources to hybrid automatic repeat request to nonzero bits. In addition, if the resource pool configuration does not have physical sidelink feedback channel resources, the method may set a physical sidelink feedback channel resources to hybrid automatic repeat request field to zero bits.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
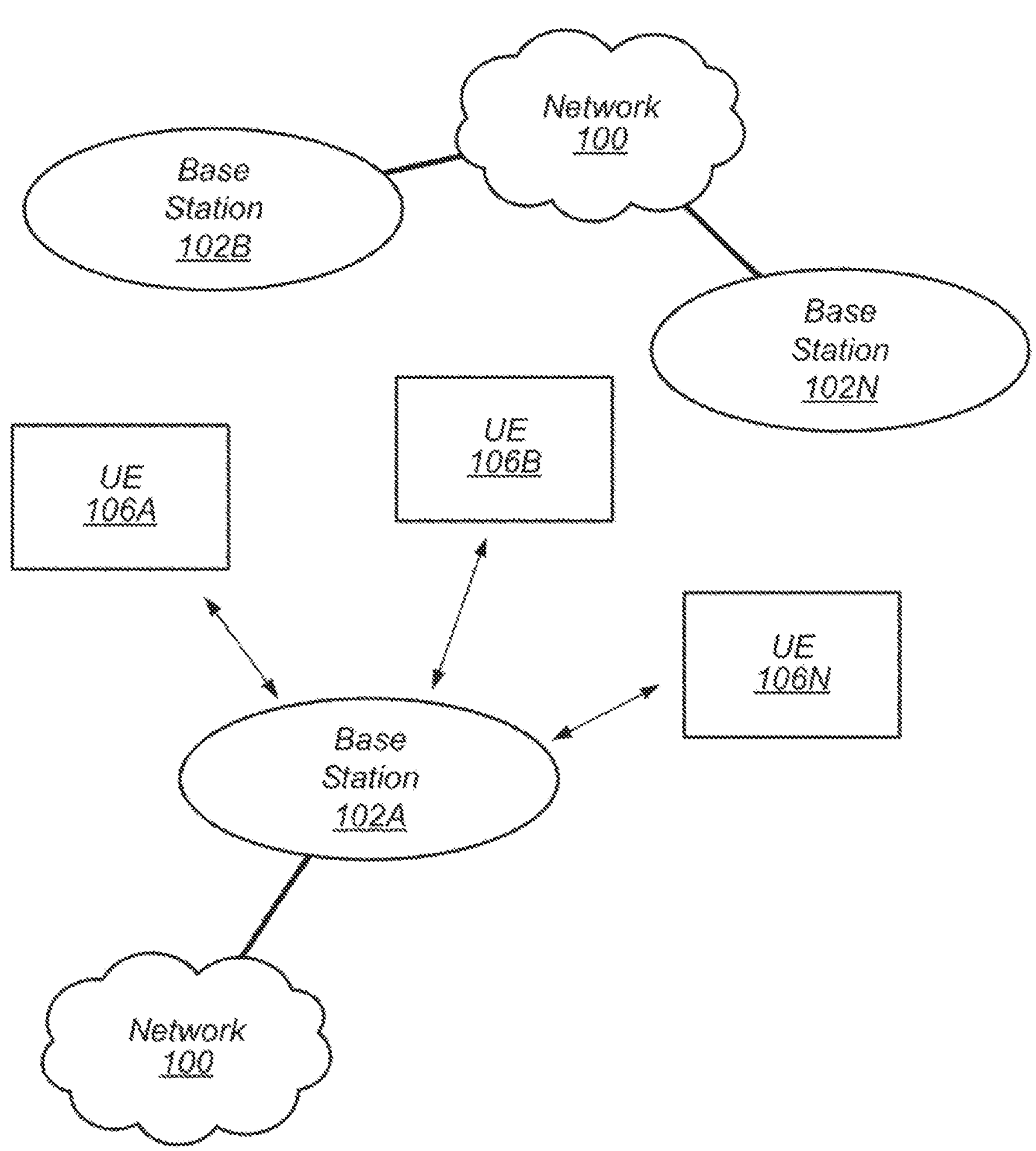
FIG. 1 illustrates an example wireless communication system according to some embodiments.

A method and apparatus of a device that selects a periodic resource on a wireless link between a user equipment and a base station is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that selects a periodic resource on a wireless link between a user equipment and a base station is described. In some embodiments, a user equipment (UE) determines a number of available resources to communicate data and selects a subset of these resources for use in communicating the data. In addition, the UE can reserve resources over different periods for periodic data communication. A problem can occur because another UE with higher priority can preempt the resource scheduled by the original UE. For example and in some embodiments, a second UE could be a device that is transmitting mission critical data, such as voice or network data that is used for public safety concerns. Because the second UE has a higher priority for the data transmission, the second UE can preempt transmissions from other non-mission critical UEs. In response to the pre-emption, the UE will need to adapt and select another resource for communication of this data.

In some embodiments, once pre-emption re-selection condition is met at the UE, re-selection is performed for the resources which satisfy the pre-emption re-selection condition. In these embodiments, the UE can ensure a Hybrid Automatic Repeat Request (HARQ) Round Trip Time (RTT) related minimum time gap Z, between re-selected and non-preempted resources during the re-selection triggered by pre-emption. In some embodiments, the time gap between any two selected data-transmission resources can large enough so that the HARQ information is sent from receiver (RX) UE to transmitter (TX) UE between the two selected data transmission resources. In these embodiments, if the HARQ feedback is ACK, then no more further data transmission is needed. Overall, this gap is used for HARQ feedback transmission and processing. Furthermore, the UE can select a resource so that HARQ retransmission resources can be reserved by a prior sidelink control information (SCI), except that where a resource cannot be found for reservation (e.g., based on the identified candidate resource set after the identification of candidate resources) for a retransmission of a transport block. In this case, the resource re-transmission can be transmitted on a resource that is not reserved. In addition, after the resource selection is performed, HARQ retransmission on a resource not reserved by a prior SCI is allowed due to transmission dropping caused by prioritization, pre-emption and congestion control.

In further embodiments, higher layer signaling can be used to configure the values of the Physical Sidelink Feedback Channel (PSFCH) to Physical Uplink Control Channel (PUCCH) gap. For example and in some embodiments, the field PSFCH-to-HARQ feedback timing indicator can be set by selecting one of the configured values of the PSFCH to PUCCH gap, except in the case that, together with PUCCH resource indicator, it indicates that no PUCCH resource is provided. This can, for example, increase the efficiency of the system as a field with zero information is not included in the transmission. Furthermore, a PUCCH resource is not configured without a PSFCH resource.

In addition, a UE may report more than 20% of the resources in a resource selection window to Media Access Control (MAC) layer as candidate resources for random selection. For example and in some embodiments, in Long Term Evolution (LTE) Vehicle-to-everything (V2X), an additional step is used to restrict the ratio of candidate resources over all resources is equal to 20%. In New Radio (NR) V2X, this step is missing, so it is possible that the ratio of candidate resources over all resource is more than 20%.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
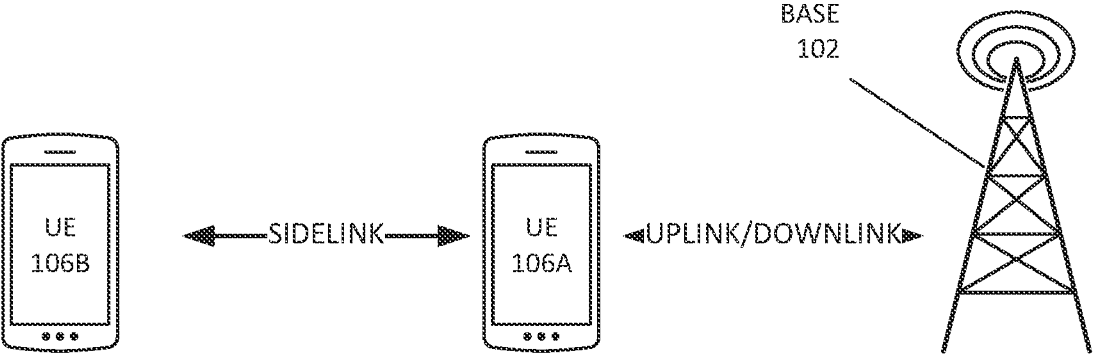
FIG. 2 illustrates a base station (BS) in communication with a user equipment (UE) device according to some embodiments.

FIG. 2 illustrates user equipment 106A and 106B that can be in direct communication with each other (also known as device to device or sidelink). Sidelink communication can utilize dedicated sidelink channels and sidelink protocols to facilitate communication directly between devices. For example, sidelink control channel (PSCCH) can be used for actual data transmission between the devices, physical sidelink shared channel (PSSCH) can be used for conveying sidelink control information (SCI), physical sidelink feedback channel (PSFCH) can be used for HARQ feedback information, and physical sidelink broadcast channel (PSBCH) can be used for synchronization. Additional details are discussed in other sections.

In addition, sidelink communications can be used for communications between vehicles to vehicles (V2V), vehicle to infrastructure (V21), vehicle to people (V2P), vehicle to network (V2N), and other types of direct communications.

UE 106A can also be in communication with a base station 102 in through uplink and downlink communications, according to some embodiments. The UEs may each be a device with cellular communication capability such as a mobile phone, a hand-held device, a computer or a tablet, or virtually any type of wireless device. The UEs 106A-B may include a processor that is configured to execute program instructions stored in memory. The UEs 106A-B may perform any of the method embodiments described herein by executing such stored instructions. Alternatively, or in addition, the UEs 106A-B may include a programmable hardware element such as an FPGA (field-programmable gate array) that is configured to perform any of the method embodiments described herein, or any portion of any of the method embodiments described herein.

The UEs 106A-B may include one or more antennas for communicating using one or more wireless communication protocols or technologies. In some embodiments, the UEs 106A-B may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UEs 106A-B may share one or more parts of a receive and/or transmit chain between multiple wireless communication technologies, such as those discussed above.

In some embodiments, the UEs 106A-B may include separate transmit and/or receive chains (e.g., including separate antennas and other radio components) for each wireless communication protocol with which it is configured to communicate. As a further possibility, the UEs 106A-B may include one or more radios which are shared between multiple wireless communication protocols, and one or more radios which are used exclusively by a single wireless communication protocol. For example, the UE 106A-B might include a shared radio for communicating using either of LTE or 5G NR (or LTE or 1×RTT or LTE or GSM), and separate radios for communicating using each of Wi-Fi and Bluetooth. Other configurations are also possible.

Figure 3:
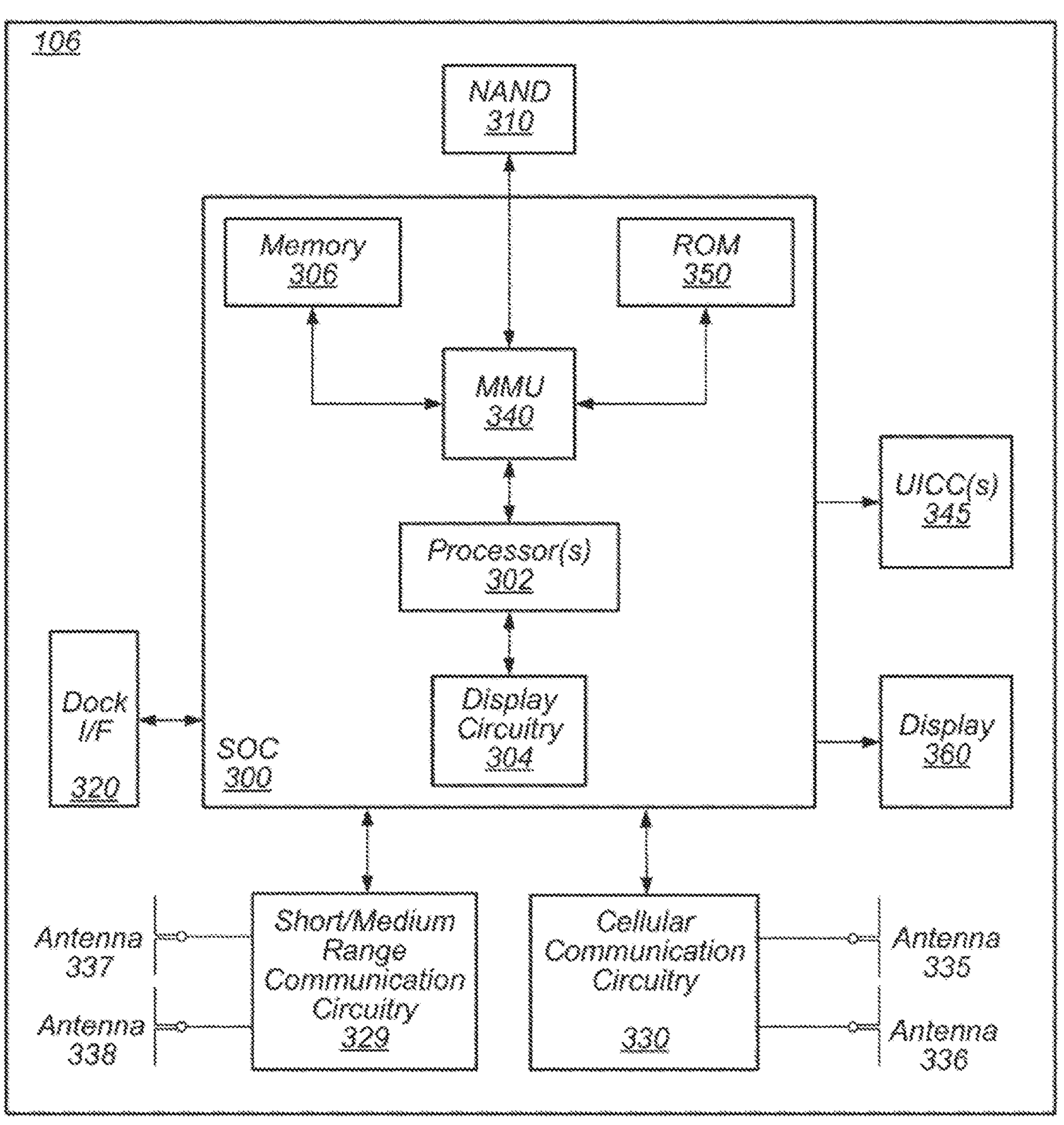
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector OF 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
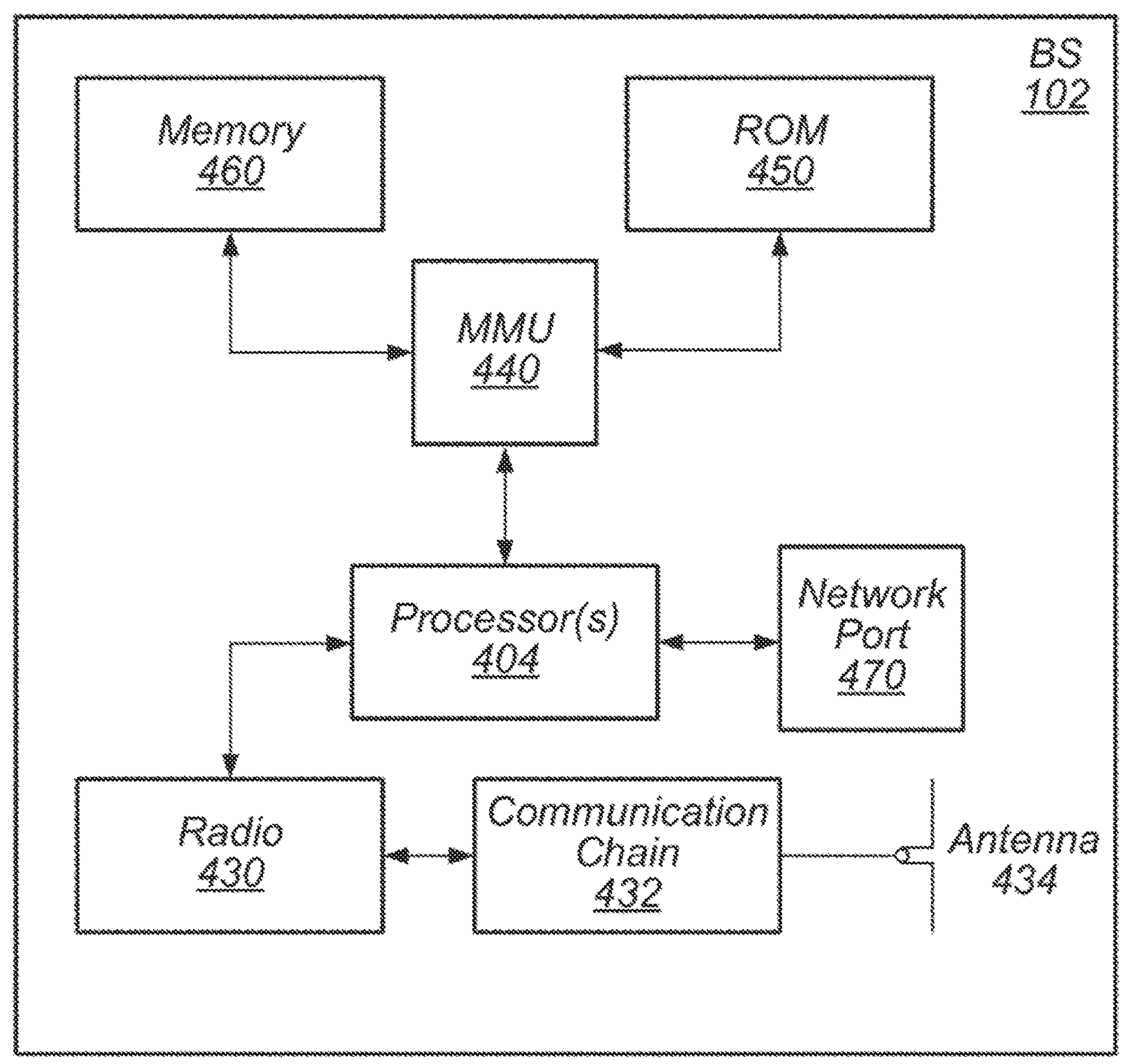
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
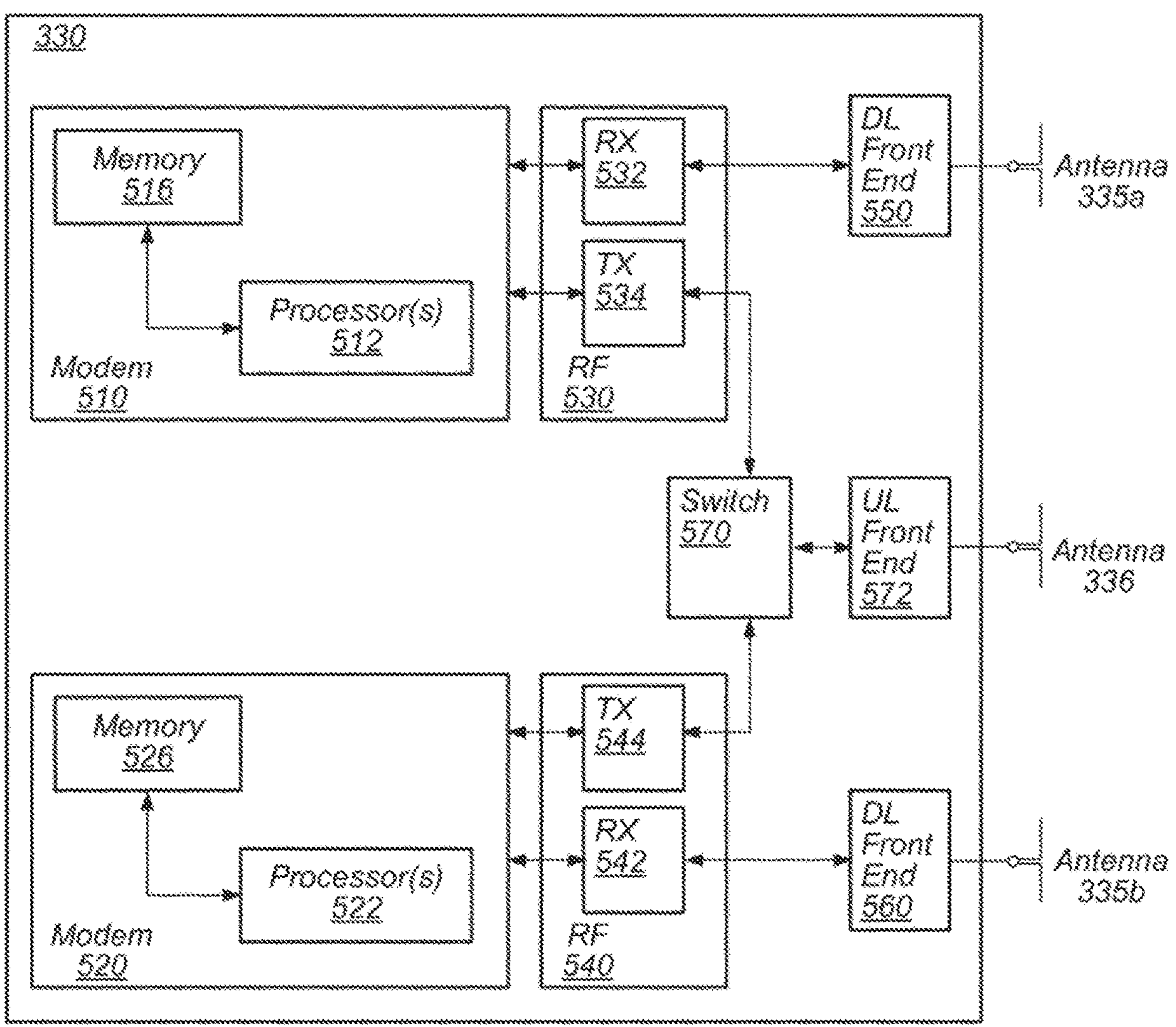
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 *a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Periodic Resource Pre-Emption

As per above, a second UE can pre-empt a resource reserved by a first UE. Pre-emption, in some embodiments, means that the resource reserved by the first UE cannot be used as the second UE with a higher priority had reserved the use of this resource at the expense of the first UE. In these embodiments, the first UE can reserve a second resource for the intended data communication. If this reservation made by the first UE is a periodic reservation, then the first UE has a choice in which resources to use for future scheduled resources. In some embodiments, the UE can use the originally reserved resource for future resources or can use future resources based on the newly reserved resource.

In some embodiments, to transmit data (e.g., voice or data), a UE will schedule a resource that is used to carry this data. In these embodiments, the UE monitors the wireless link for available resources on the wireless within a particular period. In some embodiments, the period is time period that is used for scheduling resources for data transmission. In addition, a UE can schedule periodic set of resources. In some embodiments, the UE can schedule a resource periodically spaced over multiple periods. In one embodiment, a resource is a two dimensional unit with one dimension in time (in terms of slots) and one dimension in frequency (in terms of sub-channel or RBs). The resource is used to transmit sidelink data.

A problem can occur if another UE pre-empts a resource already reserved by a first UE. In some embodiments, a second UE that has a higher priority can pre-empt a resource, where the second UE uses a resource reserved by a first UE. For example and in some embodiments, the second UE could be a device that is transmitting mission critical data, such as voice or network data that is used for public safety concerns. Because the second UE has a higher priority for the data transmission, the second UE can pre-empt transmissions from other non-mission critical UEs or non-mission critical data transmission. In response to the pre-emption, the first UE will then reschedule the previously scheduled resource. If the resource is a periodic resource, the UE will have future resources schedule at the same relative time in subsequent periods. Thus, the first UE can have the choice of scheduling future resources at the same relative time as the original resource or the new resource.

Figure 6:
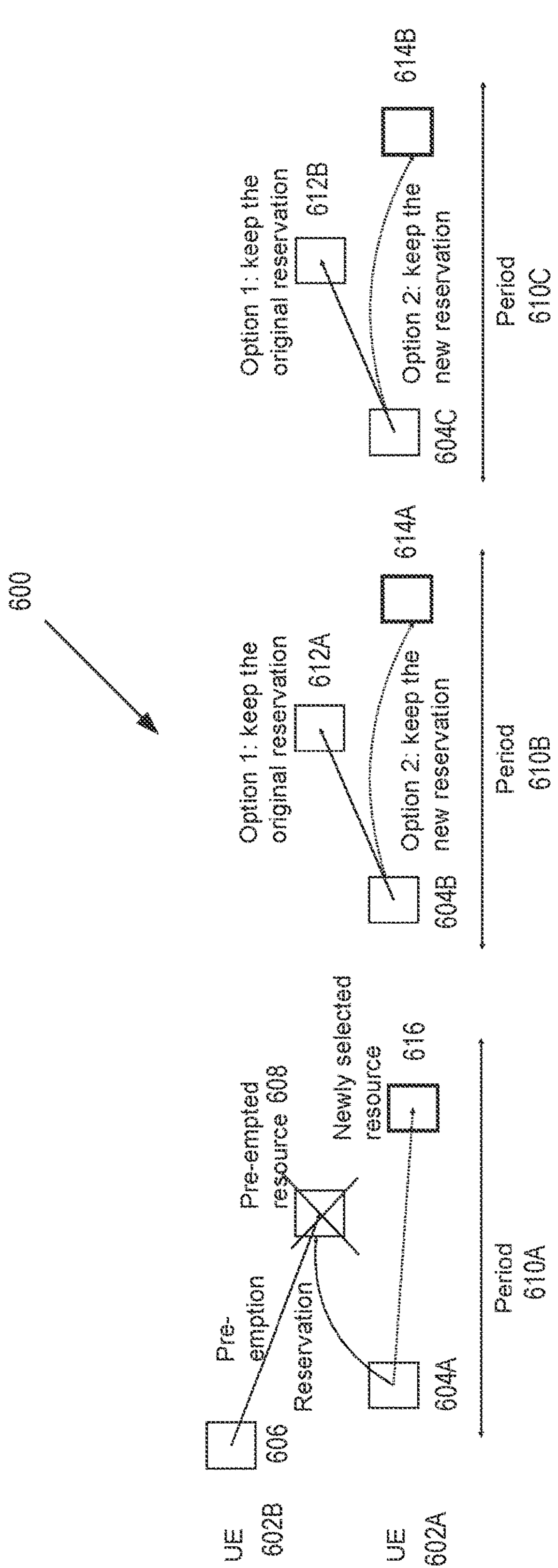
FIG. 6 is an illustration of some embodiments of resource pre-emption of a periodic resource.

FIG. 6 is an illustration of some embodiments of resource pre-emption 600 of a periodic resource. In FIG. 6, the UE 602A reserves resources 604A and 608 in period 610A. In some embodiments, each of the resources 604A and 608 can include data and control information. In these embodiments, resource 604A includes control information that references resource 608, so that a UE (not illustrated) receiving resource 604A will be able to know that resource 608 is the next resource in the communication stream from UE 602A to the receiving UE. In these embodiments, there can be one or more receiving UEs for resources 604 and 608 during period 610A. In some embodiments, the resource 608 is pre-empted by UE 602B in the period 610A. In some embodiments, UE 602B can pre-empt a resource 608 using a resource 606 because the UE 602B may have a higher priority than the UE 602A (or alternatively, the resource 606 has a priority that is greater than the UE 602A resource 604A). Because the UE 602A resource 608 is pre-empted, this resource 608 will not be transmitted unless UE 602A reschedules another resource. In some embodiments, UE 602A selects resource 616 to be used as the replacement resource. In addition to the resources 604 and 608 in period 610A, UE 602A can reserve other resources in other periods for periodic transmission to the receiving UEs. For example and in some embodiments, UE 602A has scheduled resources 604B and 612A in period 610B and scheduled resources 604C and 612B in period 610C. In addition, resources 604B-C each include control information to reference resources 612A-B, respectively.

In some embodiments, as per above, UE 602B can pre-empt a resource (e.g. resource 608) initially reserved by UE 602A. In some embodiments, UE 602A can select a new resource 616 to replace the pre-empted resource 608. In these embodiments, UE 602A updates the control information in resource 604A to indicate that resource 616 is the next resource in the communication chain.

For the resources reserved by UE 602A in periods 610B-C, UE 602A can either choose the originally reserved reservation 612A-B or use the new reservation 614A-B for future reservations. In these embodiments, UE 602A can decrement a resource selection counter if a new resource is selected after being pre-empted or have the resource selection counter remain the same if no new resource is selected after being pre-empted. Thus, in some embodiments, UE 602A has two options on the reserved resources after a resource has been pre-empted: (1) keep the original reserved resources, including the resources pre-empted or not pre-empted, (e.g., 604B-C and 612A-B, respectively) in the following periods 610B-C; or (2) use the newly selected resource, together with the reserved and not pre-empted resources, to the following periods 610B-C (e.g., 604B-C and 614A-B, respectively).

Figure 7:
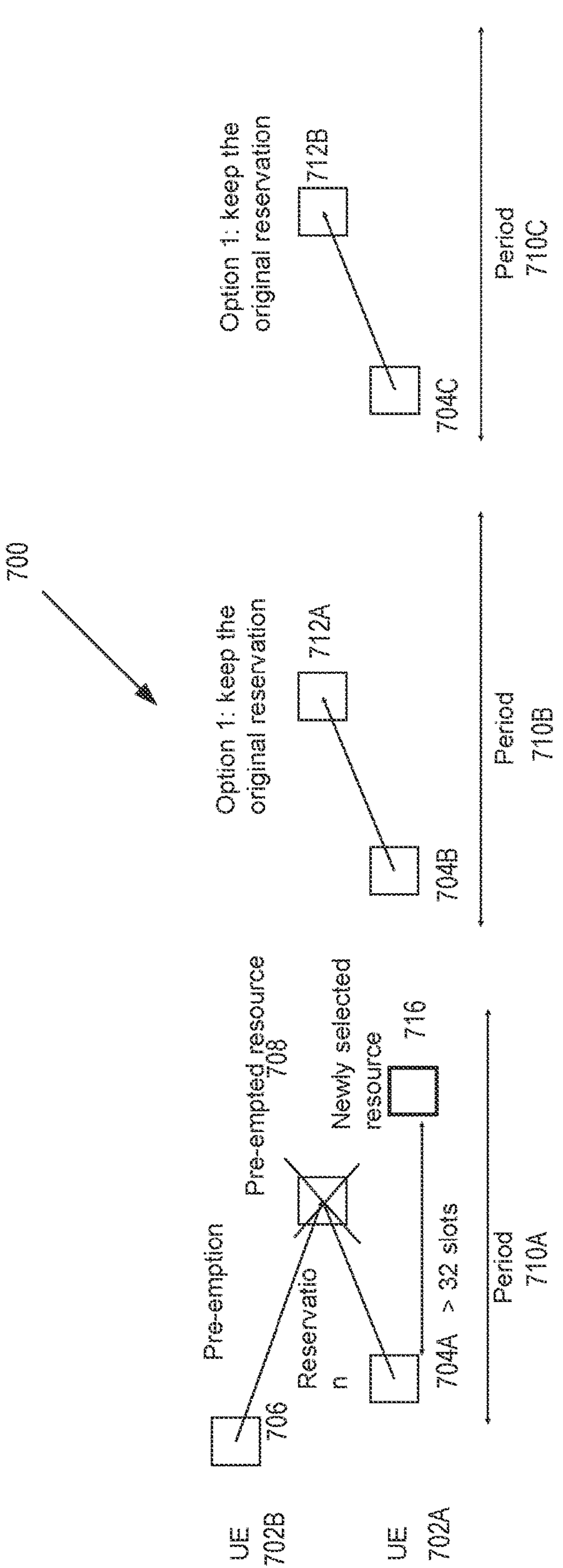
FIG. 7 is an illustration of some embodiments of resource pre-emption of a periodic resource keeping the original reservation for future resources.

FIG. 7 is an illustration of some embodiments of resource pre-emption 700 of a periodic resource keeping the original reservation for future resources. In FIG. 7, the UE 702A reserves resources 704A and 708. In addition, resource 704A includes control information to reference resource 708 as the next resource in the communication chain. As in FIG. 6, UE 702A is communicating these resource 704A and 708 to another receiving UE (not illustrated). UE 702B pre-empts resource 708 in the period 710A. In some embodiments, UE 702B can pre-empt a resource 708 using a resource 706 because the UE 702B may have a higher priority data than the UE 702A (or alternatively, the resource 706 has a priority data that is greater than the data in UE 702A resource 704A). Because the UE 702A reserved resource 708 is pre-empted, this resource 708 will not be transmitted unless UE 702A reschedules the resource 716. In some embodiments, UE 702A selects resource 716 to be used so as to be reserved by resource 704A as the replacement resource. UE 702A updates the control information in resource 704A to indicate resource 716 is the next resource in the communication chain. In further embodiments, UE 702A will need to reschedule the subsequent periodic resources, such as resources 704B-C that are in periods 710A-B. One option is to keep the original reservations of subsequent resources for periodic resources 712A-B in periods 710B-C, respectively.

In some embodiments, the pre-empted UE (e.g., UE 702A) selects the option to use based on a time gap between the original reservation and the new reservation. In these embodiments, the newly selected resource can be reserved by a transmitting UE (e.g., UE 702A) in the same period and/or the newly selected resource can reserve the following resource in the same period. For example and in some embodiments, if a time gap between the newly selected resource and its prior resource and/or its following resource is less than or equal to a threshold (e.g., 32 slots), the UE uses the newly selected resource. Alternatively, if the newly selected resource cannot be reserved by a prior resource in the same period and/or if the newly selected resource cannot reserve the following resource in the same period, the UE uses the original reservation. For example and in some embodiments, if the time gap between the newly selected resource and its prior resource and/or its following resource is larger than a threshold (e.g., 32 slots), the UE uses the originally reserved resource.

Figures 8A, 8B:
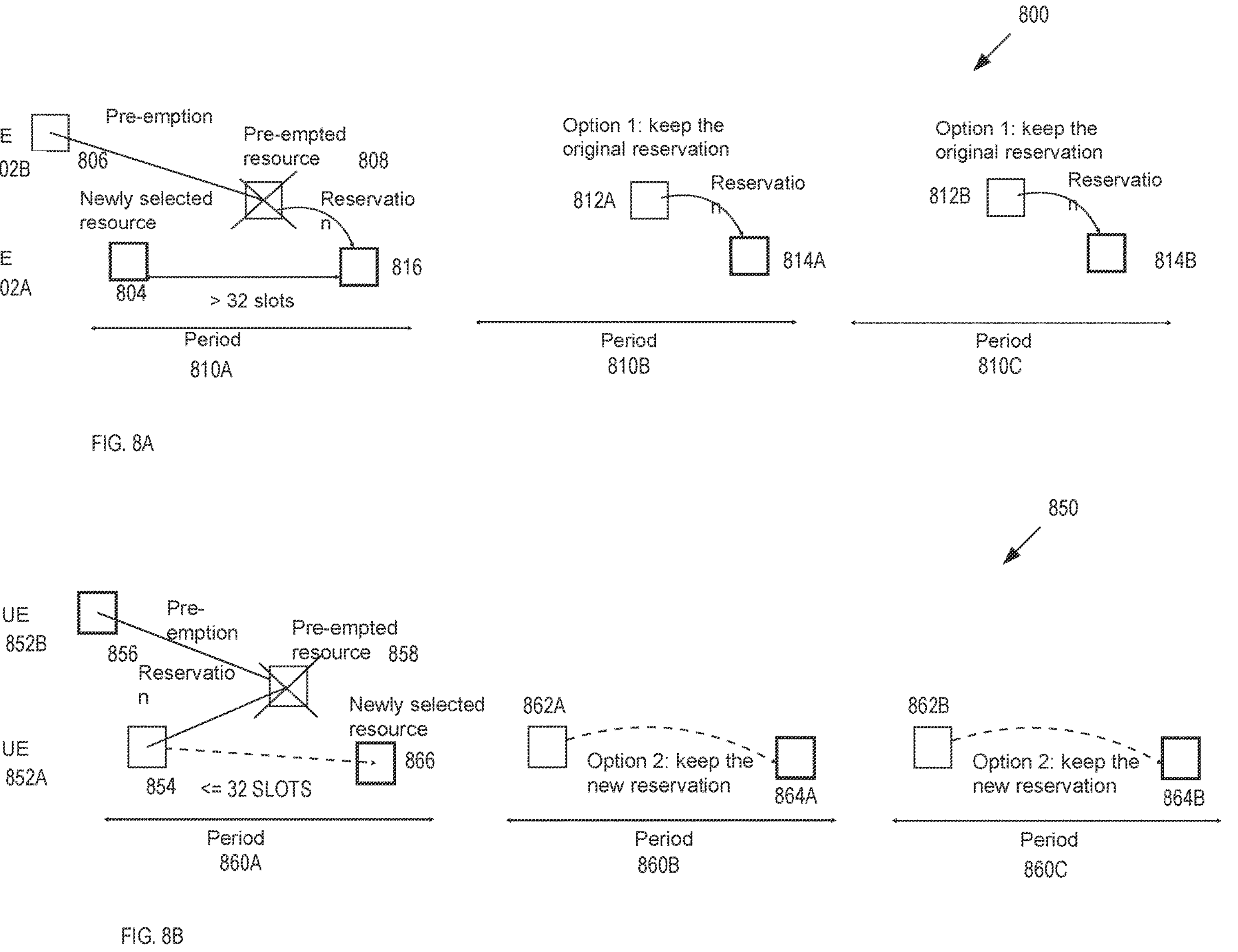
FIG. 8A-C are illustrations of some embodiments of resource pre-emption of a periodic resource either keeping the originally reserved resource or using the newly selected resource.
Figure 8C:
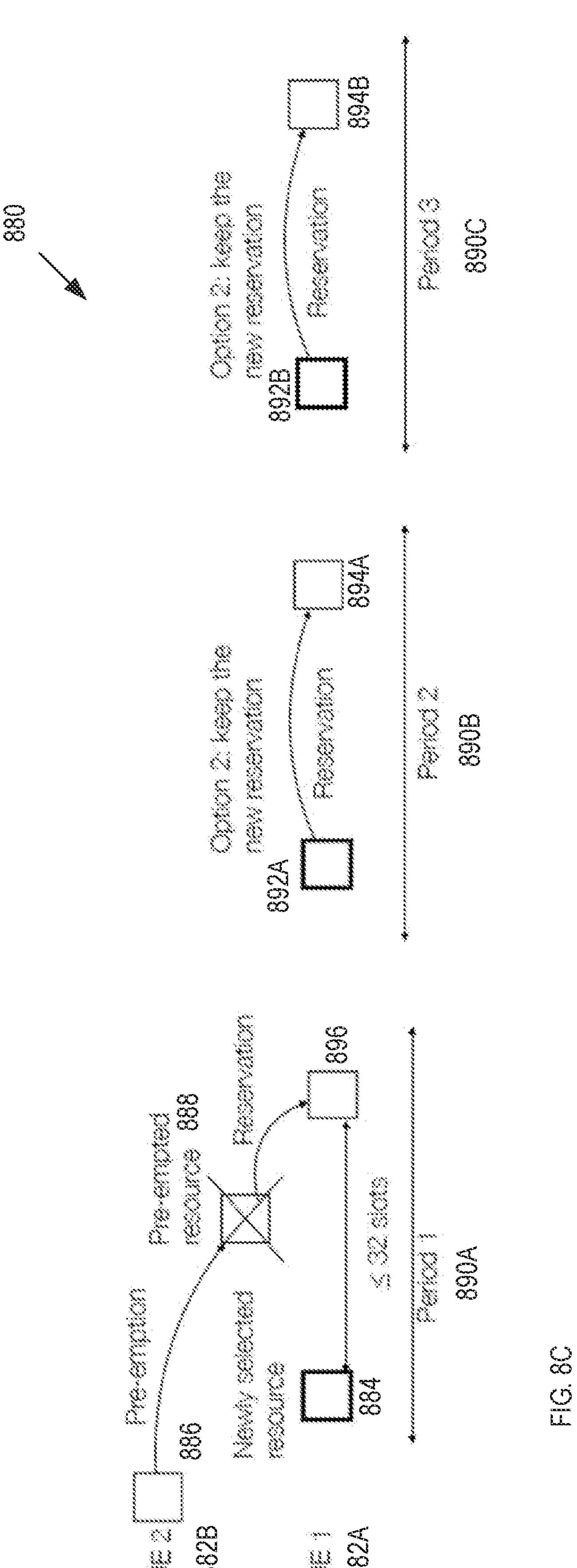

FIG. 8A-C are illustrations of some embodiments of resource pre-emption of a periodic resource either keeping the originally reserved resource or using the newly selected resource. In FIG. 8A, resource pre-emption 800 illustrates a resource pre-emption by UE 802B of resource 808 that was originally reserved by UE 802A. UE 802A initially reserved resources 808 and 816. Because the UE 802A reserved resource 808 is pre-empted, this resource 808 will not be transmitted unless UE 802A reschedules the resource 804. In some embodiments, UE 802A reserves resource 804 to as the replacement resource. In addition, UE 802A updates the control information in resource 804 to indicate resource 816 as the next resource.

In some embodiments, UE 802A has two options for rescheduling the resource in the subsequent periods 810B-C: UE 802A can either keep the original reservation or use the new reservation. In some embodiments, UE 802A determines which option to use based on at least a time gap between the new resource 804A and the initially reserved resource 816 in period 810A. If the time gap is greater than a threshold (e.g., 32 slots), UE 802A uses the original reservation (e.g., a reservation based on a slot associated with resource 8012A-B in periods 810B-C). On the other hand, if the time gap is less than or equal to the threshold (e.g., 32 slots), UE 802A uses the new reservation. As illustrated in FIG. 8A, because the time gap is greater than 32 slots, where 32 slots in the time gap threshold, UE 802A reschedules using the original resource 812A-B and resource 814A-B in periods 810A-B, respectively. In these embodiments, resources 812A-B includes control information to indicate that resources 814A-B are the next resource in the communication stream, respectively.

In alternate embodiments, as illustrated in FIG. 8B, if the time gap is less than or equal to the time gap threshold, UE 852A uses the new reservation. In these embodiments, a resource pre-emption by UE 852B of resource 858 that was originally reserved by UE 852A. UE 852A selects a new resource 866 in period 860A. For subsequently scheduled resources 864A-B, because the time gap is less than or equal to 32 slots, UE 852A uses the new resources 864A-B and initially reserved 862A-B in periods 860B-C, respectively, where resources 862A-B to indicate that resources 864A-B are the next resources in the communication stream.

In alternate embodiments, instead using a time gap based scheme for determine which reservation to use for subsequent periodic resources in subsequent periods, the UE that is rescheduling a pre-empted resource can select which option to use based on a pre-configuration of the UE. For example and in some embodiments, the UE can be configured to use the original reservation, use the new reservation, and/or some combination thereof (e.g., sometime use the original reservation, other times use the new reservation). FIG. 8C is an illustration of some embodiments resource pre-emption of a periodic resource either using the newly selected resource based on a pre-configuration. In FIG. 8C, UE 882A uses the new reservation based on a pre-configuration instead of based on a time gap. In these embodiments, a resource pre-emption by UE 882B of resource 888 that was originally reserved by UE 882A. In addition, pre-empted resource 888 includes control information that indicates resource 896 is the next resource in the communication stream. UE 882A selects a new resource 884 in period 890A and adds control information to indicate that resource 896 is the next resource for resource 884. For subsequently scheduled resources 894A-B, based on at least the pre-configuration, UE 882A uses the new reservations based on resource 884 to reserve resources 892A-B and 894A-B in periods 890B-C, respectively. In addition, UE 882A adds control information to indicate that resources 894A-B are the next resource for resources 892A-B, respectively.

Figure 9:
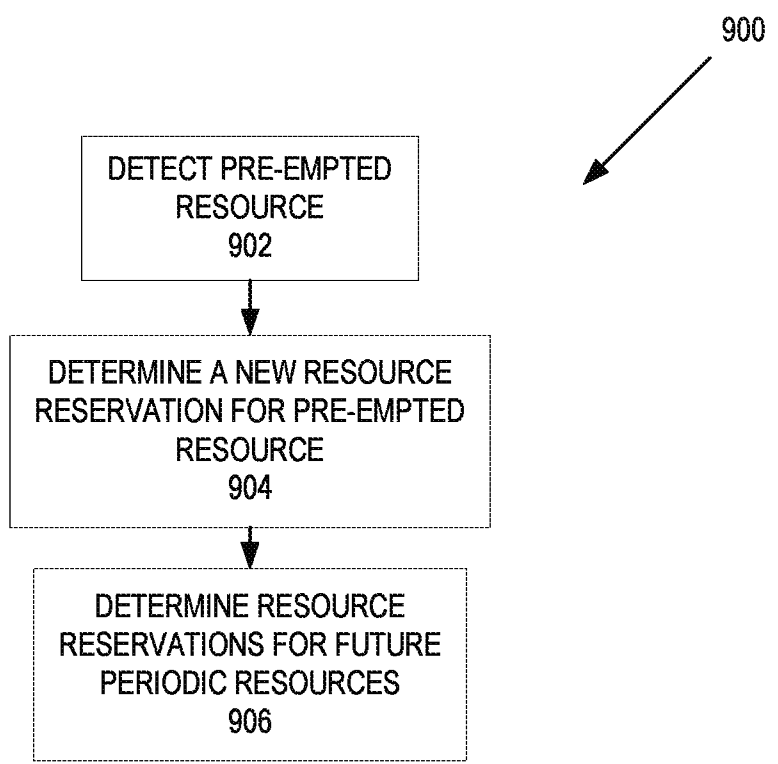
FIG. 9 is a flow diagram of some embodiments of a process to determine future resource reservation for a periodic pre-empted resource.

FIG. 9 is a flow diagram of some embodiments of a process 900 to determine future resource reservation for a periodic pre-empted resource. In some embodiments, process 900 is performed by a UE that is handling a pre-empted resource, such as UE 602A as described in FIG. 6. In FIG. 9, in process 900, the UE detects a pre-empted resource at block 902. In some embodiments, in process 900, the UE detects a pre-empted resource by sensing (e.g., SCI (Sidelink Control Information) decoding). In some embodiments, the UE decodes the SCI of other UE's transmission and knows the reservation is taken by other UE. In process 900, the UE determines a new resource reservation as a replacement for the pre-empted resource at block 904. In some embodiments, in process 900, the UE determines a new resource reservation by determining the available reservations in the current period, ranks the reservations, and sends a percentage of the ranked reservations to the Media Access Control (MAC) layer. In process 900, the UE selects a reservation from the percentage of ranked reservations to use as the new resource reservation.

At block 906, in process 900, the UE determines resource reservations for the future periodic resources. In some embodiments, in process 900, the UE can determine the resource reservations based on a time gap as described above. Using a time-gap based scheme is further described in FIG. 10 below. In alternate embodiments, in process 900, the UE can determine the resource reservations based on a configuration of the UE as described above. In addition, in process 900, the UE can update the control information to indicate the next resource in a period for a preceding resource based on the newly reserved resources.

Figure 10:
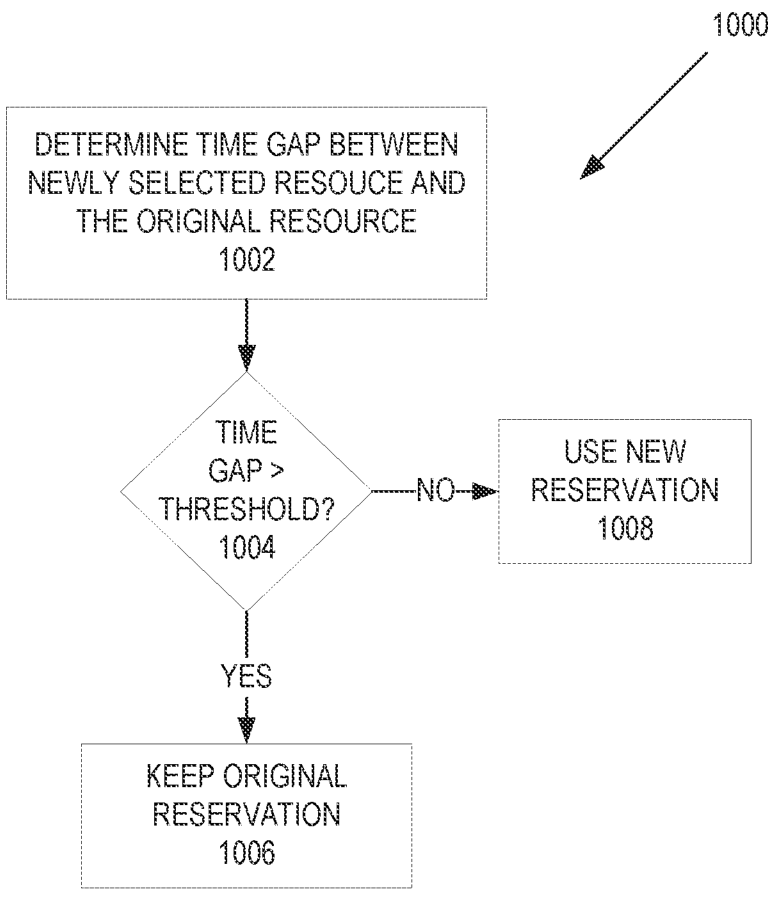
FIG. 10 is a flow diagram of some embodiments of a process to determine future resource reservation for a periodic pre-empted resource based on a time gap.

FIG. 10 is a flow diagram of some embodiments of a process 1000 to determine future resource reservation for a periodic pre-empted resource based on a time gap. In some embodiments, a process that determines resource reservations performs process 1000, such as process 900 described above. In FIG. 10, in process 1000, the UE determines a time gap between the new selected resource and the original reserved but not pre-empted resource(s) at block 1002. In some embodiments, the time gap is measured in numbers of slots. At block 1004, in process 1000, the UE determines if the time gap is greater than a threshold. While in some embodiments, the threshold is 32 slots, in alternate embodiments, the threshold can be smaller or larger, and/or measured in different units. If the time gap is greater than the threshold, execution proceeds to block 1006, where in process 1000, the UE keeps the original reserved but not pre-empted reservation, together with other reserved but not pre-empted resource(s), for the sub-sequent periods. If the time gap is less than or equal to the threshold, execution proceeds to block 1008, where in process 1000, the UE uses the new reservation together with other reserved but not pre-empted resource(s), for the sub-sequent periods.

In some embodiments, for a UE to use one or more resources for communicating data, the UE needs to identify a number of candidate resources and selects a subset of these for use. In these embodiments, for the resource selection step (candidate resource identification), the percent of identified candidate resources can be more than X %. In some embodiments, X % candidate resources can be reported to MAC layer for further random selection. In LTE V2X, sidelink Received Signal Strength Indicator (RSSI) is used for ranking the identified candidate resources so that the top X % highly ranked resources are reported to MAC layer. However, for NR V2X, sidelink RSSI is not used in resource selection procedure, a scheme is needed to restrict the candidate resources to X %.

Figure 11:
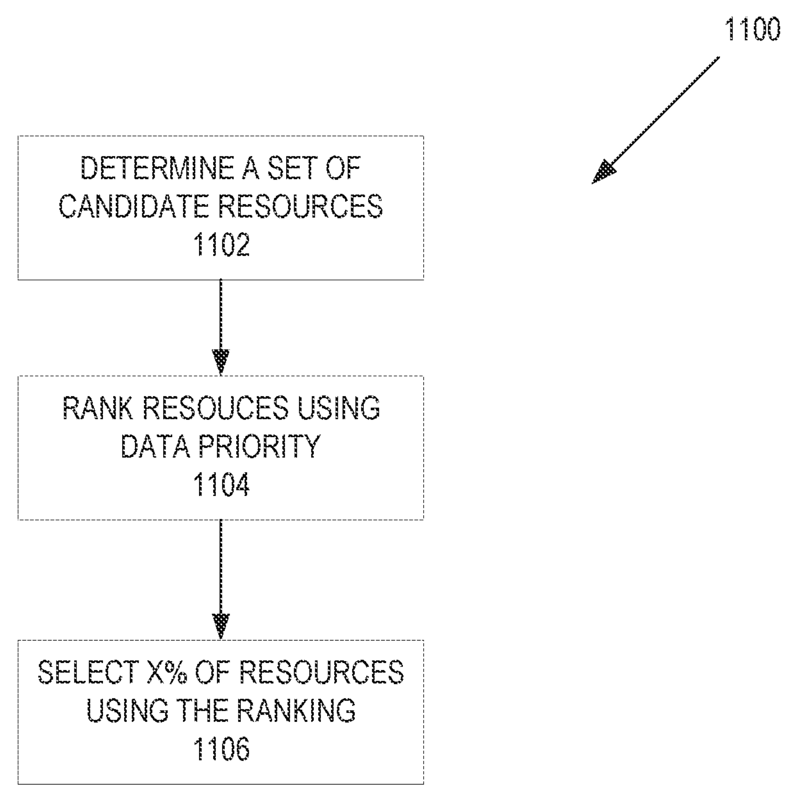
FIG. 11 is a flow diagram of some embodiments of a process to select resources.

FIG. 11 is a flow diagram of some embodiments of a process to select resources. In some embodiments, a UE can use a data priority based ranking scheme, where the UE ranks the candidate resources based on the data priority of SCI reserving the candidate resources. For higher data priority value (e.g., lower data priority of reserving SCI), the candidate resource is ranked higher. For lower data priority value (e.g., higher data priority of reserving SCI), the candidate resource is ranked lower. In some embodiments, the UE report the X % top ranked candidate resources to MAC layer of the UE. In some embodiment, a UE may perform process 1100 to select resources, such as UE 602A as illustrated in FIG. 6 above. In FIG. 11, in process 1100, the UE begins by identifying a set of candidate resources at block 1102. In some embodiments, in process 1100, the UE can identify a set of candidate resources by sensing resources and selecting resources. In some embodiments, in process 1100, the UE performs an SCI decoding sidelink measurement of available resources. In process 1100, the UE further identifies the set of candidate resources based on the sensing results. At block 1104, in process 1100, the UE ranks the candidate resources using the data priority associated with the candidate resources. In some embodiments, in process 1100, the UE uses the data priority of the SCI associated with each of the candidate resources for a ranking mechanism. For example and in some embodiments, for higher data priority value (e.g., lower data priority of reserving SCI), the candidate resource is ranked higher. For lower data priority value (e.g., higher data priority of reserving SCI), the candidate resource is ranked lower. In process 1100 and at block 1106, the UE selects X % of the candidate resources using the ranking determine in block 1104 above, e.g., the top ranked X % candidate resources. In some embodiments, X can be fixed as at a constant value (e.g., 20), can be configured between 20 and some other possible values, can depend on the priority of the data to be sent, and/or some other mechanism for setting the value of X.

In some embodiments, for a UE, Downlink Control Information (DCI) provides the UE with the necessary information such as, but not limited to, sidelink physical layer resource allocation, power control commands, HARQ information for both uplink and downlink. In these embodiments, a problem can arise in how to efficiently construct the fields of a DCI Format 3_0 for PUCCH resources. In some embodiments, the PUCCH resource cannot be configured without a PSFCH resource. In addition, a DCI Format 3_0 can provide the sidelink transmission grants as well as the PUCCH grant for reporting sidelink HARQ. In some embodiments, a sidelink is used for direct communication between user equipment and user equipment without next-generation NodeB network (gNB(NW)) in the middle, such as a 5G base station.

In some embodiments, a DCI Format 3_0 for a UE can include configurable fields for PUCCH, which depend on resource pool configuration of PSFCH periodicity. In these embodiments, if the resource pool does not have PSFCH resources (e.g., a PSFCH periodicity is 0 slot) the field of "PUCCH resource indicator" is 0 bit and the field of "PSFCH-to-HARQ feedback timing indicator" is 0 bit in the DCI Format 3_0. Alternatively, if the resource pool has PSFCH resources (e.g., PSFCH periodicity larger than 0 slot), the field of "PUCCH resource indicator" is 3 bits and the field of "PSFCH-to-HARQ feedback timing indicator" is 0, 1, 2, or 3 bits, based on configured table size. In addition, if PSFCH resources are configured in a resource pool configuration and sidelink beta offset is configured as dynamic, then DCI format 3_0 contains a 2-bit field of beta offset indicator. Otherwise, this field is not contained in DCI format 3_0. Furthermore, a UE can configure different sets of sidelink beta offsets for Ultra-Reliable and Low Latency (URLLC) and Enhanced Mobile Broadband (eMBB) uplink data. In these embodiments, the set of sidelink beta offsets for piggybacking sidelink HARQ on PUSCH with URLLC uplink data has can have smaller values than the set of sidelink beta offsets for piggybacking sidelink HARQ on PUSCH with eMBB uplink data.

Figure 12:
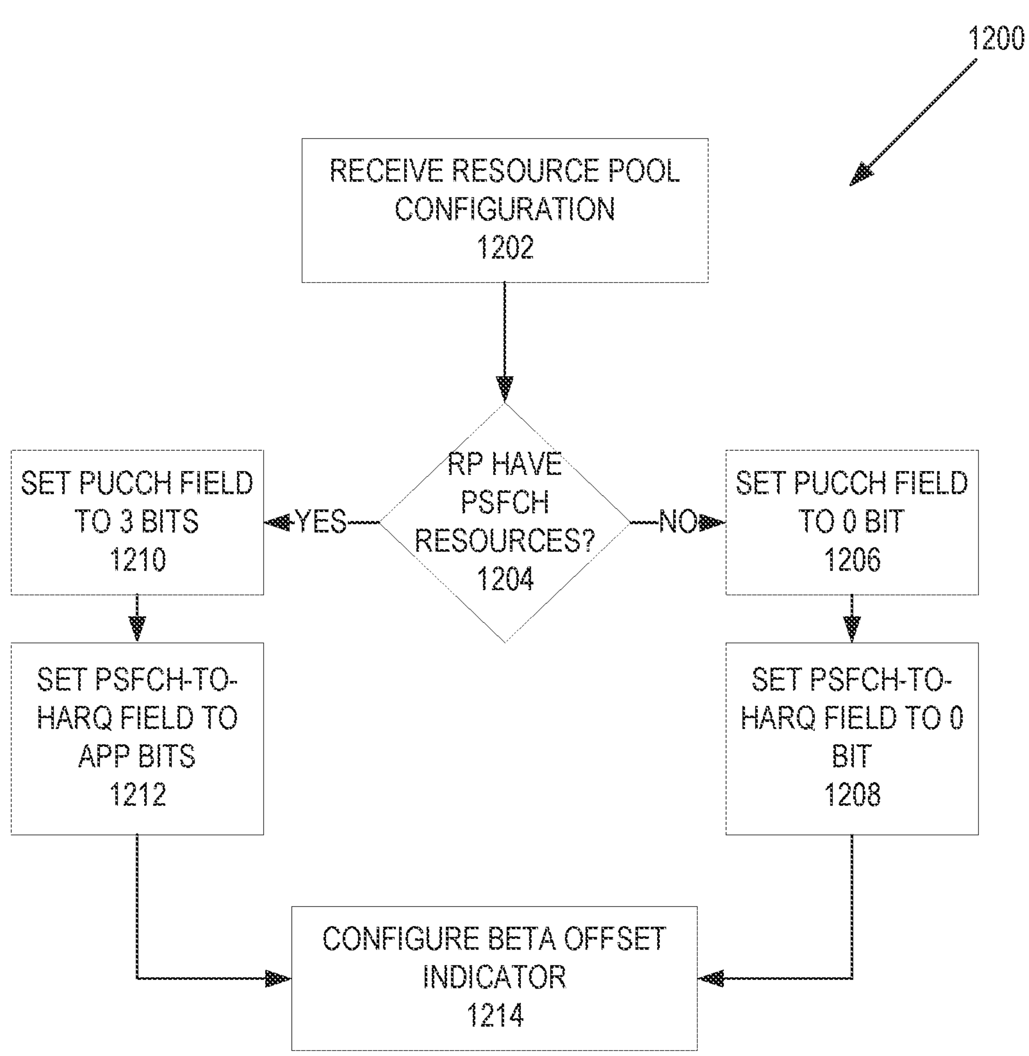
FIG. 12 is a flow diagram of some embodiments of a process to determine format DCI Format 3_0 fields for PUCCH.

FIG. 12 is a flow diagram of some embodiments of a process 1200 to format a DCI Format 3_0 fields for PUCCH. In some embodiments, a UE performs process 1200, such as UE 106 as described in FIG. 2 above, for a wireless link between the UE and a base station. In FIG. 12, in process 1200, the UE begins by receives a resource pool configuration at block 1202. In some embodiments, a resource pool configuration configures the set of time-frequency resources used for sidelink transmissions. There can be a number of parameters in the resource pool configurations, e.g., the periodicity of PSFCH, the resource size of PUCCH, the sub-channel size, the number of sub-channels, etc. At block 1204, in process 1200, the UE determines if the resource pool has a PSFCH resource. If the resource pool does not have a PSFCH resource, execution proceeds to block 1206, where, in process 1200, the UE sets the PUCCH resource indicator field to 0 bit and sets the PSFCH-to-HARQ feedback timing indicator field to 0 bit at block 1208 as well. Execution proceeds to block 1214. By setting these to fields to 0 bits, DCI format 3_0 payload size is saved and this increases the reliability of transmitting DCI format 3_0. If, at block 1204, in process 1200, the UE does determine the resource pool does have a PSFCH resource, execution proceeds to block 1210, where process 1200 sets the PUCCH resource indicator field to 3 bits and sets the PSFCH-to-HARQ feedback timing indicator field at block 1212 to an appropriate number of bits. For example and in some embodiments, the PSFCH-to-HARQ feedback timing indicator field can be set to 0, 1, 2, or 3 bits. Execution proceeds to block 1214. At block 1214, in process 1200, the UE configures a beta offset indicator. In some embodiments, in process 1200, the UE can configure the sidelink beta offset indicator field to have an appropriate number (e.g., non-zero) of bits if the resource pool has a PSFCH resource and sidelink beta offset is configured as dynamic. Otherwise, the UE can configure the sidelink beta offset indicator field to zero bit. In some embodiments, in process 1200, the UE can configure different sets of sidelink beta offsets for Ultra-Reliable and Low Latency (URLLC) and Enhanced Mobile Broadband (eMBB) uplink data. In these embodiments, the set of sidelink beta offsets for piggybacking sidelink HARQ on PUSCH with URLLC uplink data has can have smaller values than the set of sidelink beta offsets for piggybacking sidelink HARQ on PUSCH with eMBB uplink data.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "sending," "receiving," "detecting," "determining," "communicating," "transmitting," "assigning," "ranking," "decrementing," "selecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:

reserving, by a first user equipment (UE), a plurality of periodic resources on a wireless link between the first UE and a second UE for a data transmission of the first UE;

detecting that one of the plurality of periodic resources reserved by the first UE is a pre-empted resource, wherein the pre-empted resource is reserved for a data transmission of a third UE, the data transmission of the third UE having a higher priority than the data transmission of the first UE, wherein:

the plurality of periodic resources are scheduled over a plurality of periods in regular intervals, each period of the plurality of periods is associated with at least a first slot, a second slot, and a third slot, and the pre-empted resource is associated with the first slot;

in response to detecting that the one of the plurality of periodic resources is the pre-empted resource, determining a new resource for the pre-empted resource, wherein the new resource is associated with the second slot; and selecting a periodic resource of the plurality of periodic resources for use in subsequent periods for the pre-empted resource in response to determining the new resource, wherein selecting the periodic resource comprises:

determining a time gap between the new resource and a reserved resource associated with the third slot that precedes or follows the new resource, wherein the time gap is a time duration between the second slot and the third slot, and if the time gap is greater than a threshold, selecting the periodic resource associated with the first slot for use in the subsequent periods, and if the time gap is less than or equal to the threshold, selecting the periodic resource associated with the second slot for use in the subsequent periods.

2. The method of claim 1, wherein the time gap is 32 slots.

3. The method of claim 1, wherein the selecting of the periodic resource comprises:

rescheduling the periodic resource based on a configuration.

4. The method of claim 1, further comprising:

decrementing a counter when the new resource is selected after the pre-empted resource is pre-empted.

5. The method of claim 1, wherein the new resource is to be used by the first UE as a replacement for the pre-empted resource.

6. A first user equipment (UE) comprising:

a memory; and one or more processors configured to, when executing instructions stored in the memory, cause the first UE to perform operations comprising:

reserving, by the first UE, a plurality of periodic resources on a wireless link between the first UE and a second UE for a data transmission of the first UE;

detecting that one of the plurality of periodic resources reserved by the first UE is a pre-empted resource, wherein the pre-empted resource is reserved for a data transmission of a third UE, the data transmission of the third UE having a higher priority than the data transmission of the first UE, wherein:

the plurality of periodic resources are scheduled over a plurality of periods in regular intervals, each period of the plurality of periods is associated with at least a first slot, a second slot, and a third slot, and the pre-empted resource is associated with the first slot;

in response to detecting that the one of the plurality of periodic resources is the pre-empted resource, determining a new resource for the pre-empted resource, wherein the new resource is associated with the second slot; and selecting a periodic resource of the plurality of periodic resources for use in subsequent periods for the pre-empted resource in response to determining the new resource, wherein selecting the periodic resource comprises:

determining a time gap between the new resource and a reserved resource associated with the third slot that precedes or follows the new resource, wherein the time gap is a time duration between the second slot and the third slot, and if the time gap is greater than a threshold, selecting the periodic resource associated with the first slot for use in the subsequent periods, and if the time gap is less than or equal to the threshold, selecting the periodic resource associated with the second slot for use in the subsequent periods.

7. The first UE of claim 6, wherein the time gap is 32 slots.

8. The first UE of claim 6, wherein the selecting of the periodic resource comprises:

rescheduling the periodic resource based on a configuration.

9. The first UE of claim 6, wherein the operations further comprise:

decrementing a counter when the new resource is selected after the pre-empted resource is pre-empted.

10. The first UE of claim 6, wherein the new resource is to be used by the first UE as a replacement for the pre-empted resource.

11. A non-transitory computer readable storage medium storing one or more programs, the one or more programs comprising instructions, which when executed by one or more processors of a first user equipment (UE), cause the first UE to perform operations comprising:

reserving, by the first UE, a plurality of periodic resources on a wireless link between the first UE and a second UE for a data transmission of the first UE;

detecting that one of the plurality of periodic resources reserved by the first UE is a pre-empted resource, wherein the pre-empted resource is reserved for a data transmission of a third UE, the data transmission of the third UE having a higher priority than the data transmission of the first UE, wherein:

the plurality of periodic resources are scheduled over a plurality of periods in regular intervals, each period of the plurality of periods is associated with at least a first slot, a second slot, and a third slot, and the pre-empted resource is associated with the first slot;

in response to detecting that the one of the plurality of periodic resources is the pre-empted resource, determining a new resource for the pre-empted resource, wherein the new resource is associated with the second slot; and selecting a periodic resource of the plurality of periodic resources for use in subsequent periods for the pre-empted resource in response to determining the new resource, wherein selecting the periodic resource comprises:

determining a time gap between the new resource and a reserved resource associated with the third slot that precedes or follows the new resource, wherein the time gap is a time duration between the second slot and the third slot, and if the time gap is greater than a threshold, selecting the periodic resource associated with the first slot for use in the subsequent periods, and if the time gap is less than or equal to the threshold, selecting the periodic resource associated with the second slot for use in the subsequent periods.

12. The non-transitory computer readable storage medium of claim 11, wherein the time gap is 32 slots.

13. The non-transitory computer readable storage medium of claim 11, wherein the selecting of the periodic resource comprises:

rescheduling the periodic resource based on a configuration.

14. The non-transitory computer readable storage medium of claim 11, wherein the operations further comprise:

decrementing a counter when the new resource is selected after the pre-empted resource is pre-empted.

15. The non-transitory computer readable storage medium of claim 11, wherein the new resource is to be used by the first UE as a replacement for the pre-empted resource.

* * * * *